Feb. 25, 1941.    W. C. McCOY    2,233,173
VALVE
Filed July 8, 1937
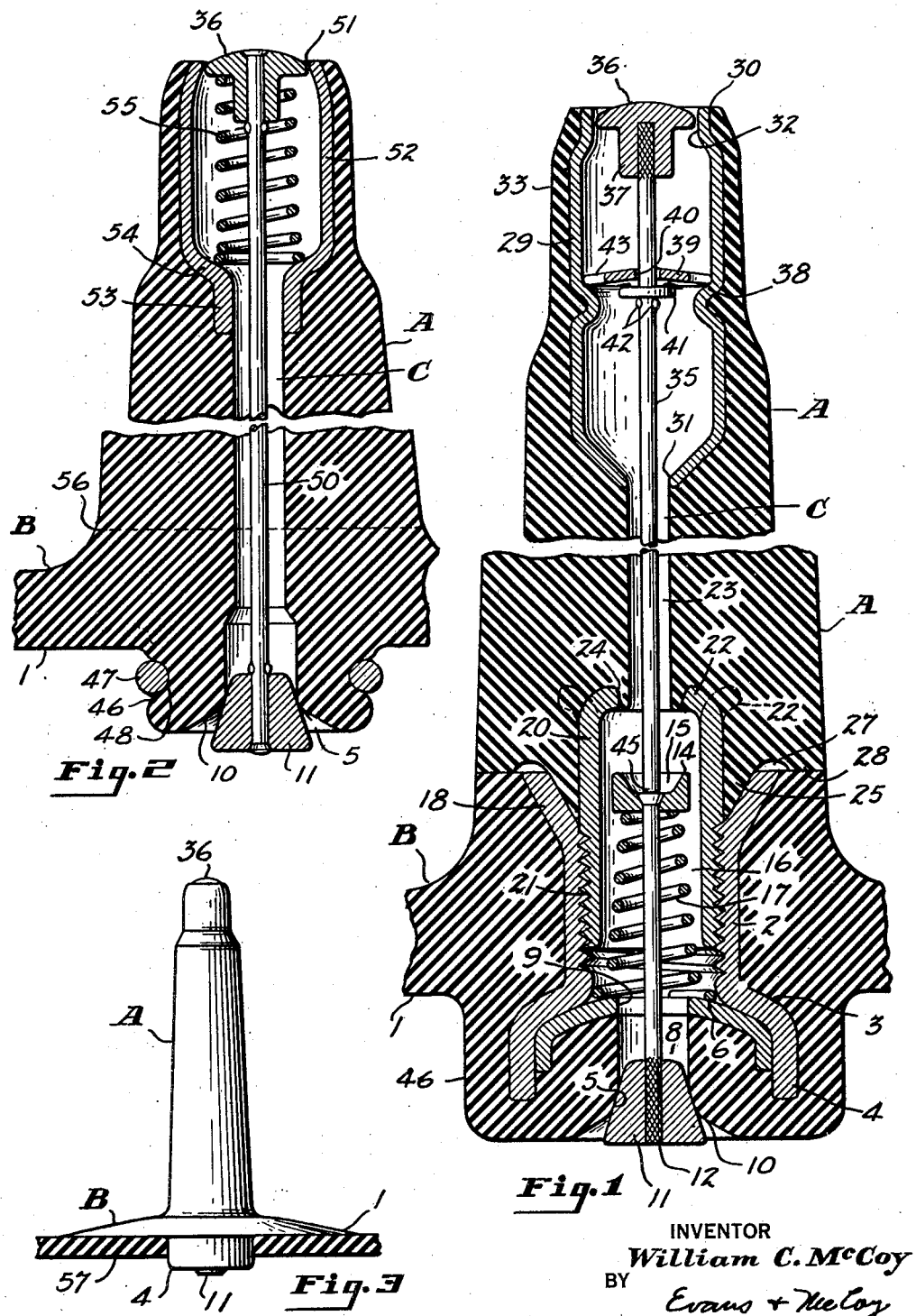
INVENTOR
William C. McCoy
BY
Evans + McCoy
ATTORNEYS Patented Feb. 25, 1941

2,233,173

UNITED STATES PATENT OFFICE 2,233,173

VALVE

William C. McCoy, Shaker Heights, Ohio, assignor, by mesne assignments, to Jenkins Bros., Bridgeport, Conn., a corporation of New Jersey Application July 8, 1937, Serial No. 152,594

22 Claims. (Cl. 152—429)

This invention relates to molded rubber valves, and more particularly to articles of this character for use in connection with inflatable vehicle tires and the like.

It is an object of the invention to provide a valve stem having the sealing means disposed at the base end thereof and with means disposed at the opposite end of the stem for actuating the sealing means to permit the flow of air through the valve stem.

Another object is to provide a valve stem having a base portion composed of a relatively soft and pliable rubber compound and an elongated body portion composed of relatively stiff rubber compound so that the base portion can be bonded to an inner tube for a vehicle tire with greater strength and greater yielding properties, and the elongated body portion of the stem resists deformation and distortion, but may be bent or molded to different angular relations for use with different kinds of tire and rim assemblies, particularly for truck and bus use.

Another and more specific object is to provide a valve stem in which the elongated body portion is separable from the base or attaching portion and the air sealing means is positioned in the latter, so that, in the event the elongated body portion is torn from the base, the valve stem maintains its sealing characteristics.

Other objects and advantages will become apparent from the following detailed description of suitable embodiments of the invention made in connection with the accompanying drawing, in which:

Figure 1 is a fragmentary, foreshortened, longitudinal sectional view, with parts broken away and parts removed, of a valve stem;

Fig. 2 is a fragmentary, foreshortened, vertical sectional view, with parts removed and parts broken away, illustrating another valve stem embodying the present invention; and Fig. 3 is an elevational view of the valve stem illustrated in Fig. 1, and reduced in size with respect thereto.

Referring to the drawing by letters and numerals of reference, in which like parts are similarly identified in the several views, the valve stems contemplated by this invention are formed of a suitable rubber compound in a vulcanizing mold. Each valve stem comprises an elongated, substantially cylindrical body portion A, which may be slightly tapered, if desired, as shown in Fig. 3, and a base B joined to the body portion at one end of the latter, and having an integral, radially extending attaching flap 1 which is preferably of circular or oval plan form. Extending longitudinally substantially through the center of the valve stem, and continuous through the body A and base B portions, is a bore or passage C.

Referring to Fig. 1, the axial passage C is lined by a tubular insert or holding member 2, the end of this holding member being directed toward the base end of the passage C and having a tapered, radially extending flange 3 terminating in a circumferential, substantially cylindrical skirt 4. The flange 3 and skirt 4 extend beyond the normal plane of the attaching flap 1 of the base B, and the rubber stock of the latter is formed to project from the under side of the flap and surround the skirt 4 to provide an annular valve seat 5. A spring seat 6, preferably formed of metal, and of conical shape to conform to the tapered flange 3, is positioned against the inside of the latter and retained by a press fit with the circular skirt 4.

The valve seat 5 has a substantially cylindrical passage portion 8 forming a part of the passage C. This portion 8 extends toward the base end of the passage from an opening 9 of substantially the same diameter in the spring seat 6, and terminates in a flared opening 10 at the extreme base end of the passage C.

A tapered valve body 11 is received in the flared opening 10 of the passage and normally has circumferential line contact with the valve seat at the junction of the cylindrical portion 8 and flared portion 10 to seal the passage through the valve stem. The form of the valve seat substantially when initially engaged by the valve body is indicated in Fig. 2 (later described), and the form it may assume after being compressed by the valve body to seal the passage C is illustrated in Fig. 1, the latter showing a substantial area of contact between the valve body and valve seat.

A pin 12 is secured in the valve body 11 and extends axially through the passage C, carrying at its end opposite the valve body a head 14 secured thereon in any suitable manner, such as by riveting. The head 14 is formed into a cup 15 opening away from the valve body 11 for a purpose to be hereinafter described. Disposed in portion 16 of the passage C, defined by the holding member 2, is a helical compression spring 17 which surrounds the pin 12. The passage portion 16 is of greater diameter than the opening 9 in the spring seat 6, so that the latter extends radially inward from the walls of the passage and receives one end of the spring 17. The opposite end of the spring bears against the under side of the head 14 to normally urge the valve body 11 into passage-sealing engagement with the valve seat 5. The direction of the force exerted by the valve body on the valve seat under the influence of the spring 17 and the air retained by the valve is in the general direction of the skirt 4 of the holding member 2, so that there is thus reinforcement of the valve seat against excessive distortion. The end of the holding member 2 opposite the reinforcing skirt 4 is outwardly flared at 18 and extends to the end of the base B of the valve stem, which is directed toward the tip end of the valve stem.

One end of a substantially tubular body holding element 20 is received within the base holding member 2 and secured by threads 21. The opposite end of the holding element 20 is secured by vulcanization in the rubber composition of the body A and is preferably formed at this end with a plurality of alternately directed legs 22, which anchor the holding member in the rubber body. This body holding element 20 is positioned axially in the valve stem and serves to define a portion of the passage C, being continuous therewith and communicating with a portion 23 of the passage C lined solely by the rubber body A through an opening 24.

The base end of the body A, in which is secured the holding element 20, is formed with an axially alined conical wedge portion 25 circumferentially surrounding the holding element 20 and arranged to be received within the flared end 18 of the base holding member 2. The wedge portion 25 is thus compressed between the holding member 2 and the element 20, so that an effective seal is afforded to keep foreign material, such as water, dust and the like, from the threads 21 and to prevent the leakage of inflating air flowing through the passage C between the threads. Additionally, the compression of the wedge portion 25 between the holding members strengthens the construction and minimizes the likelihood of the body portion A of the valve stem becoming disconnected from the holding element 20. At the base of the wedge portion 25 on the end of the body A an annular channel 27 is formed. This channel is opposite the edge of the flared end 18 of the holding member 2. Thus, an annular shoulder 28 at the base end of the body portion A, and at the peripheral edge thereof, engages a peripheral marginal portion of corresponding diameter on the upper surface of the base B, and may be tightly compressed thereagainst when the valve stem is assembled.

A reinforcing sleeve 29 is disposed in an enlarged diameter portion of the passage C at tip end 30 of the stem. The inner end of this sleeve is tapered to a small opening 31, which has a diameter corresponding to that of the rubber lined portion 23 of the passage C formed in the body A of the stem. The end of the sleeve 29 opposite the opening 31 is disposed at the tip end 30 of the valve stem, and, adjacent thereto, has a substantially cylindrical portion 32 of restricted diameter with respect to the diameter of the sleeve inwardly therefrom.

If desired, the end of the body portion A which surrounds the sleeve 29 may be of abruptly reduced diameter to provide a portion, indicated at 33, of relatively thin rubber to receive an air chuck for inflation purposes.

Extending longitudinally through the passage C, substantially from the tip end thereof and to the head 14, is a primary valve releasing pin 35. This pin is preferably formed of a relatively resilient spring-like material, such as piano wire or spring brass, so that it is adapted to conform itself to the shape of the body portion A of the valve stem when the latter is distorted. At the tip end 30 of the valve stem a dust sealing head 36 is secured on the pin 35, so that it is normally positioned in the opening of the restricted diameter portion 32 of the sleeve 29 to substantially close the same. The under side of the head 36 is formed with a depending axially directed boss 37 used in assembling the valve stem. The end of the pin 35 opposite the head 36 is received in cup 15 of the head 14, so that longitudinal movement of the pin through the passage C disengages the valve body 11 from the valve seat 5 to unseal the passage. Within the reinforcing sleeve 29, and abutting against an annular, inwardly directed, circumferential shoulder 38 thereof, is a spider 39 of the character shown in co-pending patent application, Serial No. 152,595, filed July 8, 1937. A central aperture 40 in the spider receives and guides the pin 35, and a stop washer 41, secured upon the pin 35 by crimps 42, is arranged to abut against the spider 39 to prevent the pin 35 and head 36 from falling out of the valve stem upon inversion of the latter. The spider 39 has a plurality of legs 43 which extend radially from the central body thereof in which the aperture 40 is formed.

In assembling the valve stem the spider is initially in a substantially frustoconical shape, so that the diameter between the extremities of opposite legs 43 is less than the diameter of the opening in the restricted cylindrical portion 32 at the tip end of the sleeve 29, but greater than the diameter across the opening through the circumferential shoulder 38. Thus the ends of the legs 43 initially rest on the shoulder 38, and upon forcing the lower end of the boss 37 against the central body portion of the spider 39, the latter is flattened so that the tip ends of the legs 43 are forced into the side walls of the sleeve 29 above the shoulders 38 to secure the spider in position.

The rubber-lined portion 23 of the passage C is of relatively small diameter, so that the pin 35 may be supported thereby against excessive deformation when the head 36 is depressed to unseat the valve body 11. Regardless of the degree of longitudinal bending of the valve stem, the position of inner end 45 of the pin 35 is such that it engages the head 14 within the cup thereof and is effective to depress the valve body 11 out of engagement with the valve seat 5. This is accomplished by the relatively small opening 24 through the end of the holding element 20, which prevents lateral displacement of the pin 35 beyond the effective diameter of the cup 15. Preferably the position of the stop washer 41 on the pin 35 is such that normally it is slightly spaced from the spider 39 to permit slight longitudinal play in the pin 35 and afford a clearance between the inner end 45 thereof and the bottom of the cup 15. This assures that the valve body 11 is held against the valve seat 5 with the full force of the spring 17 and prevents unseating of the valve body upon expansion of the pin 35.

In Fig. 2 is illustrated a modified construction, in which the holding member 2 and the element 20 are not employed. Reinforcement of portion 46 which projects beyond the attaching surface of the flap 1, and forms the valve seat 5, is provided by an annular ring 47 formed of non-yielding material, such as a metal band or wire. This ring circumferentially engages the projecting portion 46 to grip the latter and retain itself thereon. Preferably the portion 46 is formed with a circumferential channel or groove 48 to receive the ring 47. The reinforcing ring 47 is of the character shown in my co-pending patent application, Serial No. 163,721, filed September 14, 1937, now Patent 2,219,190, issued October 22, 1940.

The valve body 11 is rigidly secured on the end of a pin 50 formed of material similar to that employed for the pin 35 previously described in connection with Fig. 1. This pin is continuous throughout substantially the entire length of the valve stem, and at the tip end of the latter carries the dust sealing head 36, which normally substantially closes restricted opening 51 in a tubular reinforcing member or sleeve 52. This sleeve or reinforcing member lines an enlarged diameter portion of the passage C at the tip end of the valve stem and has an inner end of reduced diameter, indicated at 53, which forms an entrance into the rubber-lined portion 23 of the passage C.

A circumferential shoulder 54 between the reduced diameter portion 53 and the main portion of the reinforcing member 52 serves as a seat for a helical compression spring 55 disposed about the pin 50, and seating against the under side of the head 36. This spring, like the spring 17 described in connection with Fig. 1, urges the valve body 11 into passage-sealing engagement with the valve seat 5 and the latter is reinforced against excessive distention by the annular non-yielding ring 47.

In this modified construction the base B, formed of relatively soft rubber compound, is permanently bonded by vulcanization to the body portion A formed of relatively stiff rubber compound substantially along the line indicated by the numeral 56, which is slightly above the level of the top surface of the attaching flap 1 substantially at that portion of the valve stem where the body A commences to increase in diameter to form the base B.

Valve stems constructed in accordance with the present invention are advantageous in connection with vehicle tires and inner tubes which are likely to subject the valve stem to considerable distortion, and also with vehicle tires which employ relatively high pneumatic pressure such, for example, as truck tires. Positioning of the passage sealing means at the inner end of the passage relieves the body portion of the valve stem from the internal expansive force exerted by the air pressure in the vehicle tire or tube, thus minimizing the danger of blow-out of the valve stem during the vulcanizing operation. Additionally, the valve stem may have the body portion thereof severed or demolished, exposing the upper portion of the passage C, without permitting the escape of air.

The portion of the base B which projects below the attaching surface of the flap 1 may be positioned within a preformed aperture of corresponding size in an inner tube to which the stem is to be attached. In this manner the assembly of the valve stem to the tube is facilitated and the passage C communicates directly with the interior of the air chamber of the inner tube.

As shown in Fig. 3, the rubber of the inner tube, indicated by numeral 57, may circumferentially envelop the ring 47 and become permanently bonded to the rubber of the projecting portion of the base B. Thus, a more secure joint between the valve stem and inner tube is provided. In the event that this mode of assembly is applied to valves such as shown in Fig. 2, the projecting portion 46 of the base B is bonded to the inner tube and the ring 47 is secured in position to prevent its becoming dislodged.

The devices illustrated in the drawing are given for purposes of illustration and description only, and it is to be understood that numerous substitutions of parts and alterations in design and construction are contemplated and intended to be included within the scope of the appended claims. Reference is made to my copending application Serial No. 271,840, filed May 5, 1939, for subject matter disclosed but not claimed herein.

What I claim is:

1. A molded rubber valve stem, comprising an elongated rubber body portion formed of relatively stiff rubber composition and a rubber base portion formed of relatively soft rubber composition secured thereto, the rubber base including an attaching flap extending radially about the axis of the body portion, an air passage extending longitudinally through the stem, a valve seat in the passage and integral with the rubber of the stem, a valve body cooperable with the seat to seal the passage, and means extending to the tip of the stem opposite the base end thereof for unseating the valve body to open the passage.

2. A molded rubber valve stem, comprising an elongated rubber body portion formed of relatively stiff rubber composition and a rubber base portion formed of relatively soft rubber composition secured thereto, the rubber base including an attaching flap extending radially about the axis of the body portion, an air passage extending longitudinally through the stem, a valve seat in the passage at the base end thereof and integral with the rubber of the base, a valve body cooperable with the seat to seal the passage, and means extending to the tip of the stem opposite the base end thereof for unseating the valve body to open the passage.

3. A molded rubber valve stem, comprising an elongated rubber body portion formed of relatively stiff rubber composition and a rubber base portion formed of relatively soft rubber composition secured thereto, the rubber base including an attaching flap extending radially about the axis of the body portion, an air passage extending longitudinally through the stem, a valve seat in the passage and integral with the rubber of the stem, a valve body cooperable with the seat to seal the passage, means extending to the tip of the stem opposite the base end thereof for unseating the valve body to open the passage, and a substantially circular metallic member embracing the stem in the region of the seat to reinforce the valve seat against distension.

4. A molded rubber valve stem, comprising an elongated body portion having at one end thereof a base, including an integral, radially extending, attaching flap, a passage extending longitudinally through the stem, a valve seat formed in the passage integral with the rubber of the base and below the plane of the attaching flap, a substantially non-yielding member surrounding the passage adjacent the valve seat and arranged to reinforce the latter against distension, a valve body cooperable with the seat to seal the passage, a metallic tubular member lining an increased diameter portion of the passage at the tip of the stem opposite the base, a pin extending longitudinally through the passage substantially from the tip end thereof, said pin being laterally flexible and longitudinally substantially inextensible and incompressible, a head rigidly secured on the pin at the tip of the stem and in the passage whereby depression of the head moves the pin longitudinally through the passage, and the pin arranged upon longitudinal movement thereof to unseat the valve body to open the passage, and an integral portion on the base extending from the side thereof opposite the elongated body portion and surrounding the opening of the passage.

5. A molded rubber valve stem, comprising an elongated body portion having at one end thereof a base, including an integral, radially extending, attaching flap, a passage extending longitudinally through the stem, a valve seat formed in the passage integral with the rubber of the base and below the plane of the attaching flap, a valve body cooperable with the seat to seal the passage, a metallic tubular member lining an increased diameter portion of the passage at the tip of the stem opposite the base, a pin extending longitudinally through the passage substantially from the tip end thereof, said pin being laterally flexible and longitudinally substantially inextensible and incompressible, a head rigidly secured on the pin at the tip of the stem whereby depression of the head moves the pin longitudinally through the passage and the opposite end of the pin secured to the valve body, the head normally disposed in the passage to substantially close the same at the tip end of the same, and the pin arranged, upon longitudinal movement thereof, to unseat the valve body and displace the head to open the passage.

6. A molded rubber valve stem, comprising an elongated body portion having at one end thereof a base, including an integral, radially extending, attaching flap, a passage extending longitudinally through the stem, a valve seat formed in the passage integral with the rubber of the base and below the plane of the attaching flap, a valve body cooperable with the seat to seal the passage, a metallic tubular member lining an increased diameter portion of the passage at the tip of the stem opposite the base, a pin extending longitudinally through the passage substantially from the tip end thereof, said pin being laterally flexible and longitudinally substantially inextensible and incompressible, a head rigidly secured on the pin at the tip of the stem whereby depression of the head moves the pin longitudinally through the passage and the opposite end of the pin secured to the valve body, the head normally disposed in the passage to substantially close the same at the tip end of the same, a helical compression spring surrounding the pin and disposed in the tubular member, one end of the spring bearing against the head and one end against the tubular member to retain the valve body and seat in passage sealing engagement, and the pin arranged, upon longitudinal movement thereof, to unseat the valve body and displace the head to open the passage.

7. A molded rubber valve stem, comprising an elongated body portion having at one end thereof a base including an integral, radially extending, attaching flap, a passage extending longitudinally through the stem, an annular valve seat integral with the base at substantially the base end of the passage and below the plane of the attaching flap, a tubular metallic member disposed in the passage adjacent the seat and extending toward the end of the stem opposite the base therefrom, a valve body cooperable with the seat to seal the passage, a spring in the tubular member normally holding the valve body in passage sealing engagement with the valve seat, a pin extending through the passage from the tip end of the stem, a head rigidly secured on the pin and normally substantially closing the passage at the tip of the stem, and the pin arranged, upon longitudinal movement thereof, to unseat the valve body and open the passage.

8. A molded rubber valve stem, comprising an elongated body portion having at one end thereof a base including an integral, radially extending, attaching flap, a passage extending longitudinally through the stem, an annular valve seat integral with the base at substantially the base end of the passage, a tubular metallic member disposed in the passage adjacent the seat and extending toward the end of the stem opposite the base therefrom, a valve body cooperable with the seat to seal the passage, a spring in the tubular member normally holding the valve body in passage sealing engagement with the valve seat, a second tubular member disposed in the passage at the tip end of the stem, a pin extending through the passage, a head rigidly secured on the pin and normally substantially closing the passage, said head carried within the second tubular member, and the pin arranged, upon longitudinal movement thereof, to unseat the valve body and open the passage.

9. A molded rubber valve stem, comprising an elongated body portion having a longitudinal passage and a threaded metal holding member secured by vulcanization in one end, a base having an axial passage communicating with the body passage, the base including a radially extending, integral, attaching flap, a threaded metal holding member secured by vulcanization in the base and engageable with the body holding member to retain the body and base together, a valve seat integral with the rubber of the base formed circumferentially about the axial passage, a valve body cooperable with the seat to seal the passage, and means to normally retain the valve body and valve seat in passage sealing engagement, said body and base holding members being disconnectable without unseating the valve body from the valve seat.

10. A valve stem of separable parts comprising a molded rubber base portion having an air passage and an integral attaching flap, a molded rubber flexible body portion having an air passage alined with the air passage in the base, valve means in one of said passages for closing the same, a pair of mating metal sleeves secured, one in the base portion and a second in the body portion for connecting said base and body portions, one of said sleeves being flared to receive the other sleeve, and a rubber collar embracing said other sleeve, the rubber collar being adapted to be wedged between the embraced sleeve and the flared sleeve to effect an airtight seal between the sleeves.

11. A valve stem of separable parts comprising a molded rubber base portion having an air passage and an integral attaching flap, a molded rubber flexible body portion having an air passage alined with the air passage in the base, a pair of mating metal sleeves secured, one in the base and a second in the body for connecting said base and body, a laterally flexible, longitudinally inextensible pin disposed in the body passage for limited longitudinal movement therein, means restricting said longitudinal movement of the pin in both directions, a rubber valve seat formed in the base and reinforced against lateral distension by portions of the sleeve in the base, a valve body, resilient means normally urging the valve body into engagement with the valve seat, and an extension on the valve body directed through the passage in the base toward the body portion, said pin being engageable with the extension to effect movement of the valve body away from the seat upon longitudinal movement of the pin in the passage, and said movement restricting means serving to retain the pin within the body passage upon separating the body and base portions from one another.

12. A valve stem of separable parts comprising a molded rubber base portion having an air passage and an integral attaching flap, a molded rubber flexible body portion having an air passage alined with the air passage in the base, a pair of mating metal sleeves secured, one in the base and a second in the body for connecting said base and body, said base and body having surfaces which abut one another, and a recess in one of said portions at the surface thereof and spaced inwardly from the marginal edge thereof.

13. A valve stem of separable parts comprising a molded rubber base portion having an air passage and an integral attaching flap, a molded rubber flexible body portion having an air passage alined with the air passage in the base, a pair of mating metal sleeves secured, one in the base and a second in the body for connecting said base and body, said base and body having annular surfaces surrounding the air passage and in abutting engagement with one another, and a substantially annular recess in one of said portions at the surface thereof and extending around the air passage.

14. A valve stem of separable parts comprising a molded rubber base portion having an air passage and an integral attaching flap, a molded rubber flexible body portion having an air passage alined with the air passage in the base, a pair of mating metal sleeves secured, one in the base and a second in the body for connecting said base and body, a flared end opening on one of said sleeves to receive the other sleeve, annular surfaces on the base and body surrounding the air passage and in abutting engagement with one another, and a rubber wedge extending from one of said surfaces and compressed between said flared end and the received sleeve.

15. A valve stem of separable parts comprising a molded rubber base portion having an air passage and an integral attaching flap, a molded rubber flexible body portion having an air passage alined with the air passage in the base, a pair of mating metal sleeves secured, one in the base and a second in the body for connecting said base and body, said body sleeve being threadedly received within the base sleeve and the latter having a flared receiving end extending beyond the threaded portion thereof, annular surfaces on the body and base in abutting engagement with one another, and an integral rubber wedge extending from said body surface, said wedge embracing the body sleeve and disposed within the flared end of the base sleeve.

16. A molded rubber valve stem, comprising an elongated body portion, a base portion at one end of the body and having an integral attaching flap provided with a surface to be adhesively secured to an object to be inflated through the stem, an extension on the base protruding below the plane of said flap surface, an air passage extending through the body and base, a metal sleeve in the base portion of the passage and extending on both sides of said plane and into said extension, a rubber valve seat integral with the rubber of the base and arranged to be reinforced against radial distension by the sleeve, a valve body, and means for retaining the valve body in engagement with the seat.

17. A molded rubber valve stem, comprising an elongated body portion, a base portion at one end of the body and having an integral attaching flap provided with a surface to be adhesively secured to an object to be inflated through the stem, an extension on the base protruding below the plane of said flap surface, an air passage extending through the body and base, a metal sleeve in the base portion of the passage and extending on both sides of said plane and into said extension, said sleeve having an enlarged end portion disposed in the base extension, a rubber valve seat integral with the rubber of the extension portion of the base and arranged to be reinforced against radial distension by said enlarged end of the sleeve, a valve body, and means for retaining the valve body in engagement with the seat.

18. A molded rubber valve stem, comprising an elongated body portion, a base portion at one end of the body and having an integral attaching flap provided with a surface to be adhesively secured to an object to be inflated through the stem, an extension on the base protruding below the plane of said flap surface, an air passage extending through the body and base, and opening through the end of the extension, a rubber valve seat integral with the rubber of the extension formed around said opening of the passage and wholly below said plane, a valve body, and means for retaining the valve body in engagement with said seat.

19. A molded rubber valve stem comprising an elongated rubber body portion and a separable rubber base portion including an attaching flap, an air passage through the stem, a valve seat integral with the rubber of the base, a valve body cooperable with the seat to seal the passage, metal holding means for connecting the rubber body to the rubber base, and spring means supported by the holding means for retaining the valve body against the valve seat.

20. A valve stem comprising an elongated rubber body, a rubber attaching flap secured to the body, a rubber valve seat forming portion projecting from the flap on the side thereof opposite the body, a passage extending longitudinally through the stem, one end of said passage opening through the body and the other end of the passage opening through said projecting portion, a rubber valve seat surrounding the passage adjacent said last named opening and integral with the projecting portion, a valve body cooperable with the seat to seal the passage, a pin extending through the passage from said first named opening to the valve body, and means for urging the valve body into passage sealing engagement with the seat.

21. A valve stem comprising an elongated rubber body, a rubber attaching flap secured to the body, a rubber valve seat forming portion projecting from the flap on the side thereof opposite the body, a passage extending longitudinally through the stem, one end of said passage opening through the body and the other end of the passage opening through said projecting portion, a rubber valve seat in the passage adjacent said last named opening and integral with the projecting portion, a valve body cooperable with the seat to seal the passage, a pin extending through the passage from said first named opening to the valve body, means for urging the valve body into passage sealing engagement with the seat, and a substantially inextensible annular member disposed about the projecting portion to resist distension of the valve seat.

22. A rubber valve stem comprising a body having a tip end and a base, which includes an integral attaching flap, a passage extending through the stem, a valve seat formed in the passage integral with the rubber of the base and below the plane of the attaching flap, a valve body movable against the seat to seal the passage, a tubular metal member lining a large diameter portion of the passage at the tip end of the stem, a pin extending through the passage substantially from the tip end of the stem, said pin being laterally flexible and substantially inextensible and substantially incompressible longitudinally, a head rigidly secured on the pin at the tip end of the stem and disposed in the passage whereby depression of the head moves the pin longitudinally of the passage, said pin having connection with the valve body to unseat the latter upon longitudinal movement of the pin in the passage, and an integral portion on the base extending from the side thereof opposite the tip end of the stem and having means defining the opening into the base end of the passage.

WILLIAM C. McCOY.